US010149035B2

(12) United States Patent
Song et al.

(10) Patent No.: US 10,149,035 B2
(45) Date of Patent: Dec. 4, 2018

(54) AUTOMATIC WINDING MODULE OF WIRE FOR BLUETOOTH HEADSET WITH IMPROVED WEAR RESISTANCE FUNCTION OF ROTATION AXIS

(71) Applicant: BLUECOM CO., LTD., Incheon (KR)

(72) Inventors: Hyunyoung Song, Incheon (KR); Yongchul Au, Incheon (KR); Beomseok Kim, Incheon (KR)

(73) Assignee: BLUECOM CO., LTD., Incheon (KR)

( * ) Notice: Subject to any disclaimer, the term of this patent is extended or adjusted under 35 U.S.C. 154(b) by 1 day.

(21) Appl. No.: 15/437,914

(22) Filed: Feb. 21, 2017

(65) Prior Publication Data

US 2018/0063622 A1    Mar. 1, 2018

(30) Foreign Application Priority Data

Aug. 31, 2016 (KR) .................. 10-2016-0112121
Feb. 10, 2017 (KR) .................. 10-2017-0018682

(51) Int. Cl.
| | | |
|---|---|---|
| H04R 25/00 | (2006.01) | |
| H04R 1/10 | (2006.01) | |
| B65H 75/48 | (2006.01) | |
| B65H 75/40 | (2006.01) | |
| H02G 11/02 | (2006.01) | |
| H04R 5/033 | (2006.01) | |

(52) U.S. Cl.
CPC ......... *H04R 1/1033* (2013.01); *B65H 75/406* (2013.01); *B65H 75/48* (2013.01); *H02G 11/02* (2013.01); *H04R 1/10* (2013.01); *H04R 5/0335* (2013.01); *B65H 2701/52* (2013.01)

(58) Field of Classification Search
CPC ............ B65H 75/48; H04R 1/10; H04M 1/15
USPC ........ 381/374; 242/384.7, 378.1, 376, 385.1, 242/378.2, 379, 379.2
See application file for complete search history.

(56) References Cited

U.S. PATENT DOCUMENTS

| | | | | |
|---|---|---|---|---|
| 5,241,593 A | * | 8/1993 | Wagner ................... | H04M 1/15 191/12.4 |
| 6,213,421 B1 | * | 4/2001 | Franklin ............... | B60C 27/066 152/219 |
| 6,439,491 B1 | * | 8/2002 | Liao ................... | B65H 75/4434 242/376 |
| 6,644,582 B1 | * | 11/2003 | Liao ....................... | H02G 11/02 242/375.1 |
| 6,736,346 B1 | * | 5/2004 | Park ................... | B65H 75/4434 242/378.1 |
| 7,900,670 B2 | * | 3/2011 | McCauley .............. | B60C 27/10 152/217 |
| 8,077,149 B2 | * | 12/2011 | Yang ....................... | G06F 3/039 345/163 |

(Continued)

FOREIGN PATENT DOCUMENTS

| | | |
|---|---|---|
| KR | 10-1471903 B1 | 12/2014 |
| KR | 10-1471904 B1 | 12/2014 |

*Primary Examiner* — Phylesha Dabney
(74) *Attorney, Agent, or Firm* — Rabin & Berdo, P.C.

(57) ABSTRACT

An automatic winding module of a wire for Bluetooth headset with an improved wear resistance function of a rotation axis, which firmly maintains a rotation axis without twist of the rotation axis even in case of using it for a long time, thereby preventing breakaway between a terminal and a PCB pattern, to prevent a short circuit from occurring.

5 Claims, 6 Drawing Sheets

(56) References Cited

U.S. PATENT DOCUMENTS

| | | | | |
|---|---|---|---|---|
| 8,720,509 B2* | 5/2014 | Pengg | ................... | B60C 27/10 |
| | | | | 152/217 |
| 9,072,341 B2* | 7/2015 | Jungkind | ............. | A43C 11/165 |
| 9,193,561 B2* | 11/2015 | Yan | ...................... | B65H 75/406 |
| 9,339,089 B2* | 5/2016 | So | ........................ | A43C 11/165 |
| 2004/0129820 A1* | 7/2004 | Liao | .................. | B65H 75/4423 |
| | | | | 242/378.1 |
| 2005/0008185 A1* | 1/2005 | Jeong | ................ | B65H 75/4431 |
| | | | | 381/374 |
| 2005/0109869 A1* | 5/2005 | Wei | ................... | B65H 75/4434 |
| | | | | 242/370 |
| 2013/0119178 A1* | 5/2013 | Masuda | ............ | B65H 75/4434 |
| | | | | 242/378.1 |

* cited by examiner

AUTOMATIC WINDING MODULE OF WIRE FOR BLUETOOTH HEADSET WITH IMPROVED WEAR RESISTANCE FUNCTION OF ROTATION AXIS

BACKGROUND OF THE INVENTION

Field of the Invention

The present invention relates to an automatic winding module of a wire and, more specifically, relates to an automatic winding module of a wire for Bluetooth headset with an improved wear resistance function of a rotation axis, which firmly maintains a rotation axis without twist of the rotation axis even in case of using it for a long time, thereby preventing breakaway between a terminal and a PCB pattern, to prevent a short circuit from occurring.

Description of the Related Art

Due to the development of science and technology, it has become common to listen music and watch video through a MP3, a smart phone or a tablet PC. At this time, the earphones are frequently used, regardless of use location.

Conventionally, the earphone can include an earphone output portion for outputting sounds and an earphone wire for supplying signal outputs, which are generated from a device connected to the earphone output portion, to the earphone output portion.

Generally, the earphone wire has an extra length without causing discomfort during the use thereof. As a result, if the user does not use the earphones, the earphone wire can be tangled or twisted. Accordingly, there is a hassle and a discomfort in that the earphone wire should be released during the use thereof.

Therefore, in order to solve the above problem, the technologies of Patent Literature 1 and Patent Literature 2 have been proposed.

The Patent Literature 1 relates to an automatic rewinding device used in electronic equipment, which includes a base plate, a fixed shaft vertically extending from one surface of the base plate, a wheel punctured by the fixed shaft and revolving on the fixed shaft, a wire wound around a circumferential surface of the wheel with one end fixed on the circumferential surface of the wheel, an elastic member rolled up into a roll form with one end fixed at the fixed shaft and the other end fixed at a part of the wheel, a cap rotating together with the wheel in a state of being integrally combined to the wheel and having a ball track on a surface facing an upper case, the upper case covering the cap and having a linear groove into which a ball is inserted, and the ball inserted between the ball track and the linear groove of the upper case so as to rotate along the ball track in a state of being inserted into the linear groove when the cap integrally combined to the wheel rotates in one direction.

The Patent Literature 2 relates to an automatic rewinding device used in electronic equipment, which includes: a base plate; a fixed shaft vertically extending from one surface of the base plate; a wheel punctured by the fixed shaft and revolving on the fixed shaft; a wire wound around a circumferential surface of the wheel with one end fixed on the circumferential surface of the wheel; an elastic member rolled up into a roll form with one end fixed at the fixed shaft and the other end fixed at a part of the wheel; a cap rotating together with the wheel in a state of being integrally combined to the wheel and having a track on a surface facing a case; the case covering the cap; and a wire spring inserted between the cap and the case, and elastically bending into an arc shape so that one end thereof is fixed by the case and the other end thereof is inserted into the track. The track includes an external track dented in a circumferential direction of the cap; an internal track formed within a radius of the external track and dented in the circumferential direction of the cap; two or more linear connecting tracks connecting the internal track and the external track in a state of being dented; and two or more stop connecting tracks connecting the in internal track and the external track in a state of being dented, and disposed between one of the linear connecting tracks and another of the linear connecting tracks while bending into a '>' shape.

However, in case of the Patent Literature 1 and the Patent Literature 2, since the internal parts wear down owing to the rotation thereof for long-duration usage, the rotation shaft becomes unsound. That is, the rotation shaft is disintegrated or transformed. Accordingly, since the operating parts are separated from regular positions thereof during the operation thereof, the deviation between terminals and PCB patterns is generated, so that the short can occur. Also, since the ball is inserted into or deviated from the track, there are problems of malfunctions in that the automatic wire rewinding is impossible etc.

In addition, where the terminals (for example, 4 PIN terminals) contacted with the PCB patterns (for example, PCB patterns for 4 PIN terminals) are increased, it requires a mutual contact (PCB patterns-Terminals) by means of more precise rotation. However, in case of the conventional arts including the Patent Literature 1 and the Patent Literature 2, since the rotation shaft is twisted or the parts is separated from the rotation shaft owing to the rotation thereof for long-duration usage, the short can occur more easily. Accordingly, so as to solve the above problems, it needs improved technologies.

PATENT LITERATURE

Patent Literature 1: Korean Patent Registration No. 10-1471903 (Dec. 5, 2014)
Patent Literature 2: Korean Patent Registration No. 10-1471904 (Dec. 5, 2014)

SUMMARY OF THE INVENTION

The present invention has been made in an effort to solve the problems of the conceptual description of the conventional art as described above, and the objective of the present invention is to provide an automatic winding module of a wire which firmly maintains a rotation axis without twist of the rotation axis even in case of using it for a long time, thereby preventing breakaway between a terminal and a PCB pattern, to prevent a short circuit from occurring.

Also, another objective of the present invention is to provide an automatic winding module of a wire, wherein a rotation axis is firmly maintained without twist of a rotation axis even in case of using it for a long time, thereby preventing failure of a wire winding function caused by twist of the rotation axis.

According to an aspect of the invention to achieve the object described above, there is provided an automatic winding module of a wire for Bluetooth headset including: a base housing (100); a wire; a winding housing (400) having an outer circumference on which the wire is wound; and a cap (700), wherein the base housing (100) includes a cylindrical fixed axis (110) which protrudes to be vertical to one surface at the center of one surface of a case, wherein the winding housing (400) includes a sub-base lower housing (410) which is formed in a cylindrical cover type with one opened side, a cylindrical winding bobbin (420) which is provided at the center of the other side of the sub-base lower housing such that a wire is wound on the outer circumference thereof, and a sub-base upper housing (430) which is provided on the other side of the winding bobbin (420) and is configured in a cylindrical shape with the other side opened in a direction opposite to a direction of opening the sub-base lower housing (410) with respect to the winding bobbin (420), and wherein the winding housing (400) is provided with a hollow at the center thereof such that the fixed axis (110) is coupled while consecutively passing through the centers of the sub-base lower housing (410), the winding bobbin (420), and the sub-base upper housing (430), and includes a wear-resistant improved insert (440) on the inner circumference of the hollow center.

Advantageous Effects

Accordingly, the present invention has an effect capable of providing the automatic winding module of the wire which firmly maintains the rotation axis without twist of the rotation axis even in case of using it for a long time, thereby preventing breakaway between the terminal and the PCB pattern, to prevent a short circuit from occurring.

Moreover, the present invention has another effect capable of providing the automatic winding module of the wire, wherein the rotation axis is firmly maintained without twist of the rotation axis even in case of using it for a long time, thereby preventing failure of the wire winding function caused by twist of the rotation axis.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
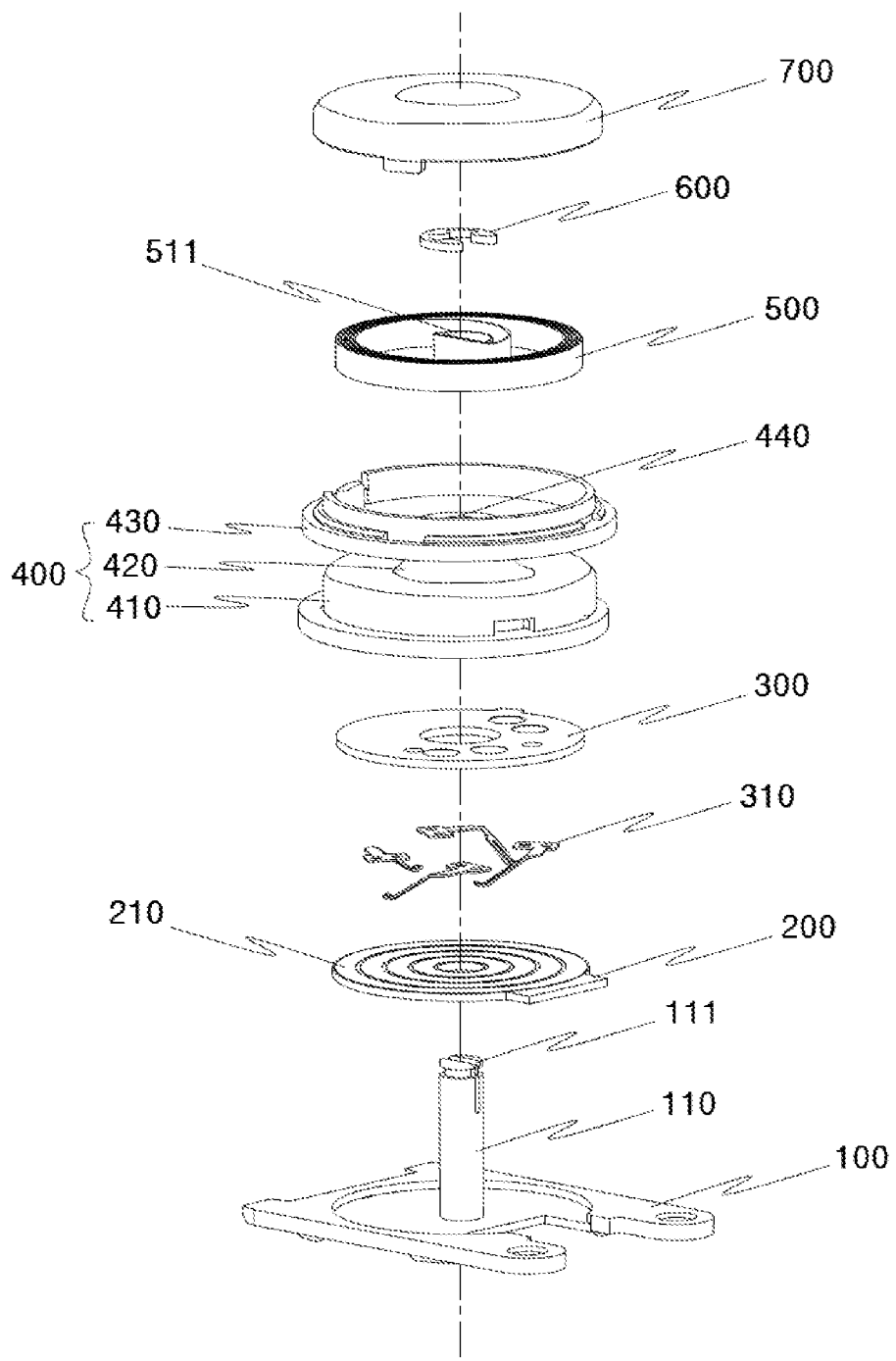
FIG. 1 is an exploded perspective view illustrating an automatic winding module of a wire for Bluetooth headset with an improved wear resistance function of a rotation axis according to a first embodiment of the present invention.

Hereinafter, the invention may be variously modified and may have various embodiments, and specific embodiments are exemplified in the drawings and described in detail. However, the invention is not limited to specific embodiments, and it should be understood that the invention includes all modifications, equivalents, and substitutes included within the spirit and technical scope of the invention. The embodiments are provided to describe the invention in more detail to persons skilled in the art. Accordingly, the shape of each element illustrated in the drawings may be exaggerated to emphasize more obvious description and, when it is determined that specific description about the related art may blur the gist of the invention, detailed description thereof is omitted.

Hereinafter, preferred embodiments of the invention will be described in more detail with reference to the accompanying drawings.

First, an automatic winding module of a wire for Bluetooth headset according to the invention includes a base housing (100), a winding housing (400) having an outer circumference on which the wire is wound, and a cap (700).

The base housing (100) includes a cylindrical fixed axis (110) which protrudes to be vertical to one surface at the center of one surface of a case.

The winding housing (400) includes a sub-base lower housing (410) which is formed in a cylindrical cover type with one opened side, a cylindrical winding bobbin (420) which is provided at the center of the other side of the sub-base lower housing (410) such that a wire is wound on the outer circumference thereof, and a sub-base upper housing (430) which is provided on the other side of the winding bobbin (420) and is configured in a cylindrical shape with the other side opened in a direction opposite to a direction of opening the sub-base lower housing (410) with respect to the winding bobbin (420).

The winding housing (400) is provided with a hollow at the center thereof such that the fixed axis (110) is coupled while consecutively passing through the centers of the sub-base lower housing (410), the winding bobbin (420), and the sub-base upper housing (430), and includes a wear-resistant improved insert (440) on the inner circumference of the hollow center.

Figure 2:
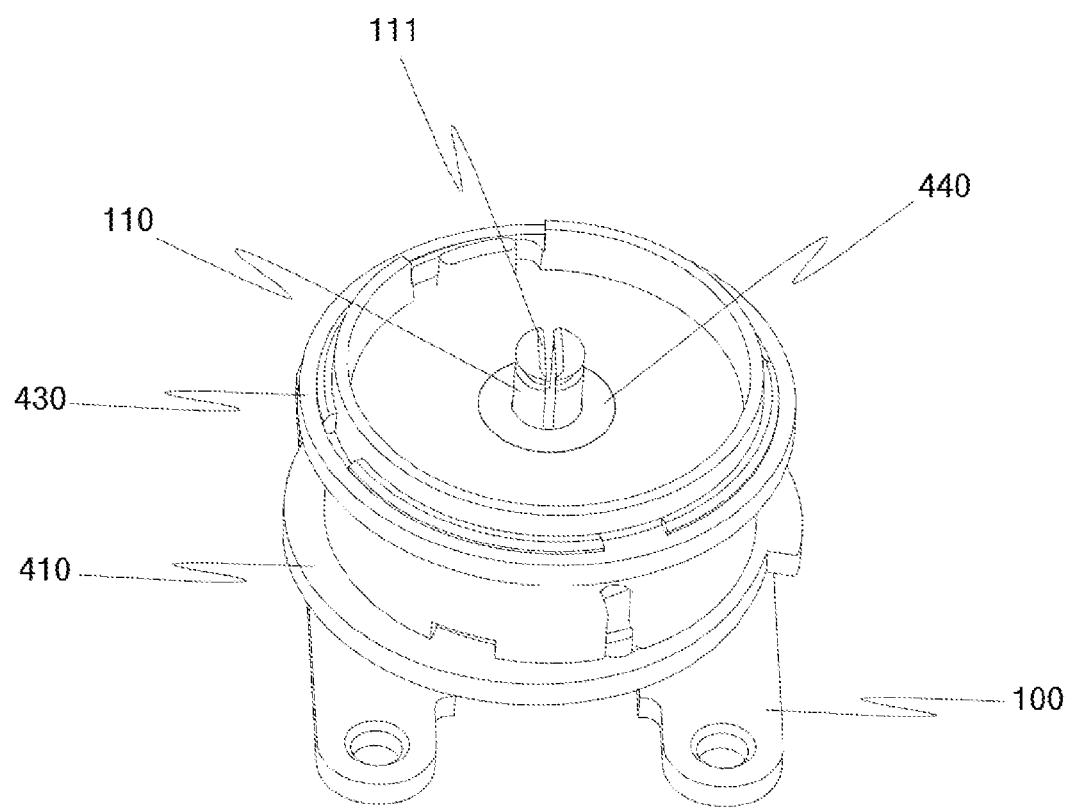
FIG. 2 is a perspective view illustrating a status of coupling a wear-resistant improved insert (440) to a winding housing (400) of an automatic winding module of a wire for Bluetooth headset with an improved wear resistance function of a rotation axis according to a first embodiment of the present invention.
Figure 3:
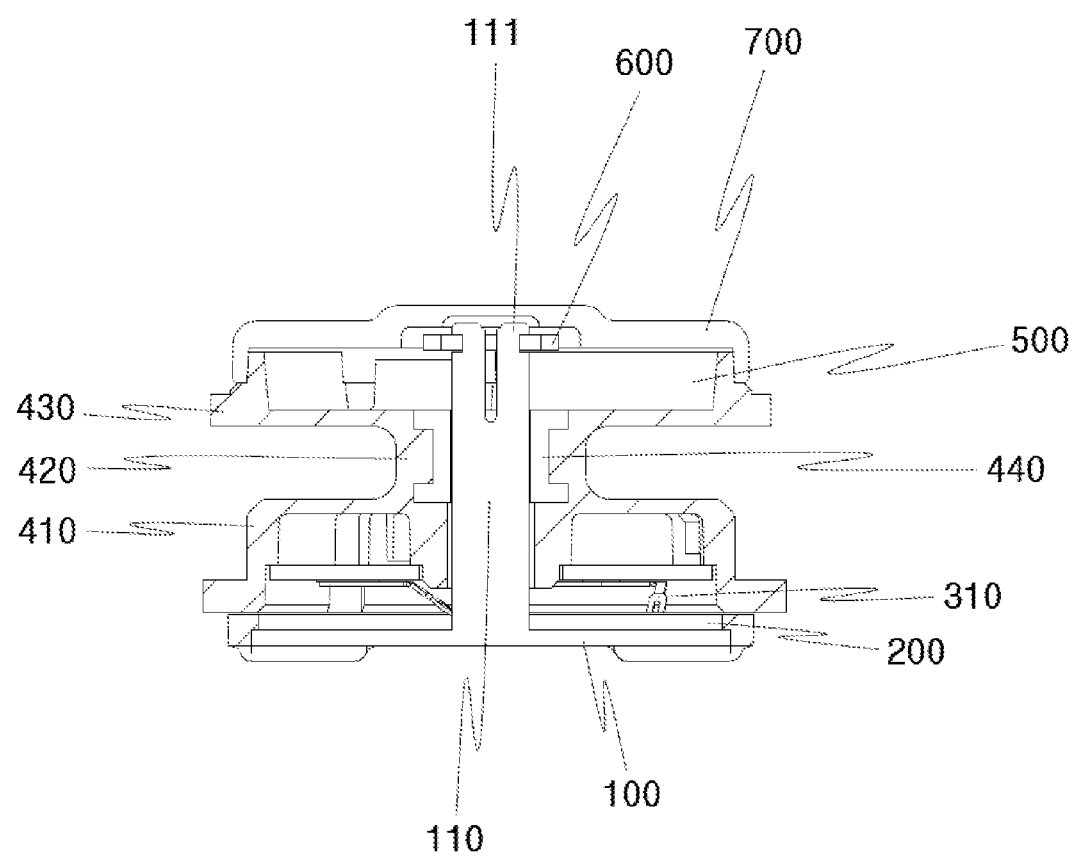
FIG. 3 is a sectional view illustrating a coupling status of an automatic winding module of a wire for Bluetooth headset with an improved wear resistance function of a rotation axis according to a first embodiment of the present invention.

Referring to FIG. 1 to FIG. 3, the invention according to the first embodiment is an automatic winding module of a wire. In this case, the automatic winding module may include a base housing (100) on which a cylindrical fixed axis (110) is formed in a direction vertical to one side thereof at the center of the side.

In this case, the automatic winding module may include a PCB substrate (200) which is coupled to one side of the base housing (100), is provided with a hollow at the center thereof such that the fixed axis (110) is coupled while passing through the center, and is provided with a PCB pattern (210) formed on the other side of the surface coming in contact with the base housing (100).

In this case, the automatic winding module may include a contact terminal coupling plate (300) which is provided with a pin contact terminal (310) coupled to one side thereof, is provided with a hollow at the center thereof such that the fixed axis (110) is coupled while passing through the center, and is configured such that the pin contact terminal (310) comes in contact with the PCB pattern (210) of the PCB substrate (200).

In this case, the automatic winding module may include a winding housing (400) including a sub-base lower housing (410) which is formed in a cylindrical cover type with one opened side, a cylindrical winding bobbin (420) which is provided at the center of the other side of the sub-base lower housing (410) such that a wire is wound on the outer circumference thereof, and a sub-base upper housing (430) which is provided on the other side of the winding bobbin (420) and is configured in a cylindrical shape with the other side opened in a direction opposite to a direction of opening the sub-base lower housing (410) with respect to the winding bobbin (420), and the winding housing (400) is provided with a hollow at the center thereof such that the fixed axis (110) is coupled while consecutively passing through the centers of the sub-base lower housing (410), the winding bobbin (420), and the sub-base upper housing (430), and includes a wear-resistant improved insert (440) on the inner circumference of the hollow center.

In this case, the automatic winding module may include a rolling elastic member (500) which has elasticity as a rolled type, and is accommodated in the sub-base upper housing (430) to provide rotational force to the winding housing (400).

In this case, the automatic winding module may include a closing clip (600) which is coupled to the end of the fixed axis (110), and prevents the winding housing (400) and the rolling elastic member (500) from escaping from the fixed axis (110).

In this case, the automatic winding module may include a cap (700) which is configured in a cover type in which one side thereof covers the opening of the sub-base upper housing (430) and is coupled to the sub-base upper housing (430).

In this case, the automatic winding module may include a button unit (not illustrated) which is coupled to one side of the base housing (100) and one side of the winding housing (400), and allows a wire to be wound on the winding housing (400) by rotating the winding housing (400) by elasticity of the rolling elastic member (500) when a button is pushed.

The base housing (100) is configured in a plate type, and includes a cylindrical fixed axis (110) formed in a direction vertical to one side at the center of the side.

The PCB substrate (200) is configured to couple to one side of the base housing (100).

The PCB substrate (200) is provided with a hollow at the center thereof such that the fixed axis (110) is coupled while passing through the center portion.

The PCB substrate (200) includes a PCB pattern (210) on the outer side of the surface coming in contact with the base housing (100).

In this case, the PCB pattern (210) may be configured with a PCB pattern for 2 pins.

In this case, the PCB pattern (210) may be configured with a PCB pattern for 4 pins.

The contact terminal coupling plate (300) is provided with a pin contact terminal (310) coupled on one side thereof.

In this case, the pin contact terminal (310) may be configured with any one of a 2-pin contact terminal or a 4-pin contact terminal in accordance with the PCB pattern (210).

The contact terminal coupling plate (300) is provided with a hollow at the center thereof such that the fixed axis (110) is coupled while passing through the center.

The contact terminal coupling plate (300) may be rotated about the fixed axis (110).

The contact terminal coupling plate (300) is configured such that the pin contact terminal (310) comes in contact with the PCB pattern (210) of the PCB substrate (200) at the time of being coupled to the fixed axis (110).

The winding housing (400) includes a sub-base lower housing (410), a winding bobbin (420), and a sub-base upper housing (430).

The winding housing (400) is provided with a hollow at the center thereof such that the fixed axis (110) is coupled while consecutively passing through the center.

The winding housing (400) may rotate about the fixed axis (110).

The winding housing (400) includes a wear-resistant improved insert (440) on the inner circumference of the hollow center.

Preferably, the wear-resistant improved insert (440) is made of metal.

The sub-base lower housing (410) is configured in a cylindrical cover type with one opened side.

The sub-base lower housing (410) is provided with a hollow at the center thereof such that the fixed axis (110) is coupled while passing through the center.

The sub-base lower housing (410) accommodates the PCB substrate (200) and the contact terminal coupling plate (300) therein at the time of being coupled to the fixed axis (110).

The winding bobbin (420) is cylindrical, and is configured at the center of the other side of the sub-base lower housing (410), and a wire is wound on the outer circumference thereof.

The winding bobbin (420) is provided with a hollow at the center thereof such that the fixed axis (110) is coupled while consecutively passing, at the time of being coupled while passing through the center of the sub-base lower housing (410).

The sub-base upper housing (430) is provided on the other side of the winding bobbin (420), and is configured in a cylindrical type with the other side opened in a direction opposite to a direction of opening the sub-base lower housing (410) with respect to the winding bobbin (420).

The sub-base upper housing (430) is provided with a hollow at the center thereof such that the fixed axis (110) is coupled while consecutively passing through the sub-base lower housing (410) and the winding bobbin (420) together.

The sub-base upper housing (430) is provided with an accommodation space to accommodate the rolling elastic member (500) and the closing clip (600) therein.

In other words, the winding housing (400) is coupled in a type in which the sub-base lower housing (410) is opened outwards on one side thereof and the sub-base upper housing (430) is opened outwards on the other side thereof, with respect to the winding bobbin (420).

The winding housing (400) may include braking teeth which is installed in a circumferential direction of the winding housing (400) on the outer circumferential surface of the winding housing (400), is provided with an arc-type inclination surface on any one surface, and is provided with an inclination surface forming an obtuse angle with the surface on the other surface.

The rolling elastic member (500) has elasticity as a rolled type.

The rolling elastic member (500) is fitted to a lock coupling groove (111) of the fixed axis (110), after the fixed axis (110) is coupled to the winding housing (400) while passing.

In other words, in a rolled state of the rolling elastic member (500), one end positioned at the center in a rolled state is coupled to the fixed axis (110), the other end positioned on the outskirts is coupled to the sub-base upper housing (430). Accordingly, when the winding housing (400) is rotated about the fixed axis (110), the rolling elastic member (500) provides elasticity to the winding housing (400) to re-rotate the winding housing (400) in the opposite direction.

The rolling elastic member (500) is accommodated in the sub-base upper housing (430) to provide rotational force to the winding housing (400).

The closing clip (600) is coupled to the end of the fixed axis (110).

The closing clip (600) prevents the winding housing (400) and the rolling elastic member (500) from escaping from the fixed axis (110).

The cap (700) is configured in a cover type in which one side thereof covers the opening of the sub-base upper housing (430) and is coupled to the sub-base upper housing (430).

The cap (700) is provided with a coupling groove insertion portion (711) to which the end of the lock coupling groove (111) is fitted, at the center of one side.

Accordingly, the invention according to the first embodiment can provide an automatic winding module of a wire for Bluetooth headset with improved wear resistance of a rotation axis.

Figure 4:
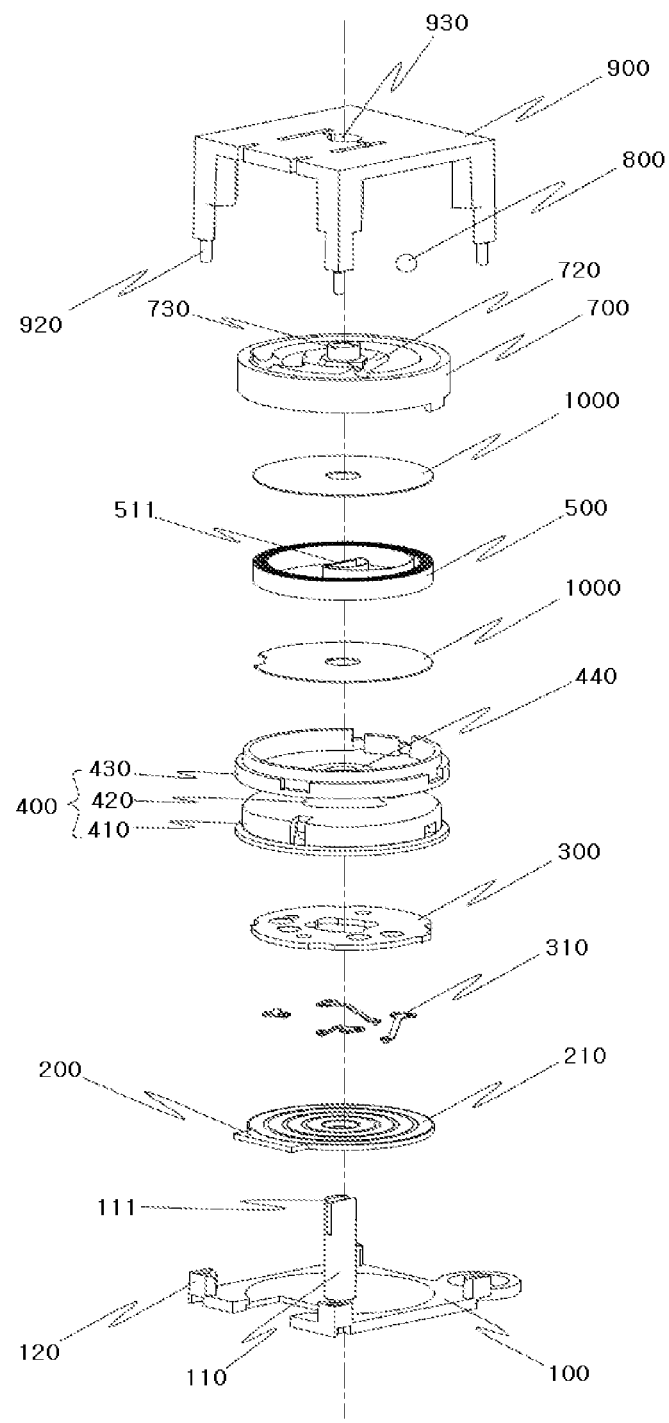
FIG. 4 is an exploded perspective view illustrating an automatic winding module of a wire for Bluetooth headset with an improved wear resistance function of a rotation axis according to a second embodiment of the present invention.
Figure 5:
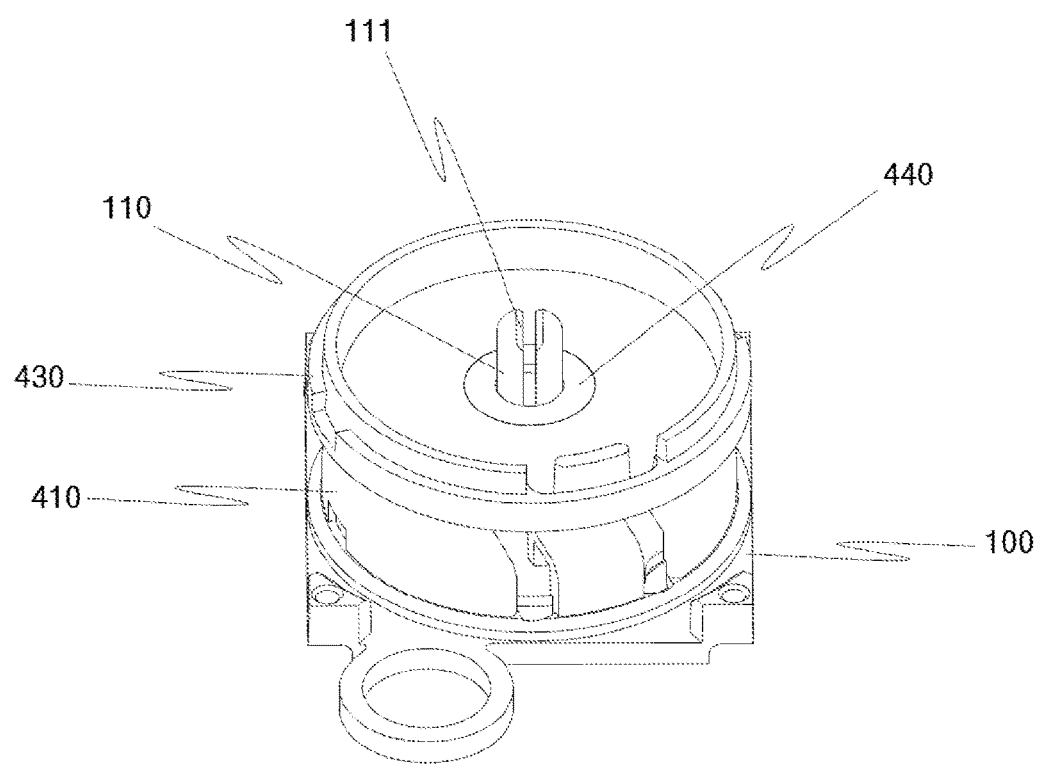
FIG. 5 is a perspective view illustrating a status of coupling a wear-resistant improved insert (440) to a winding housing (400) of an automatic winding module of a wire for Bluetooth headset with an improved wear resistance function of a rotation axis according to a second embodiment of the present invention.
Figure 6:
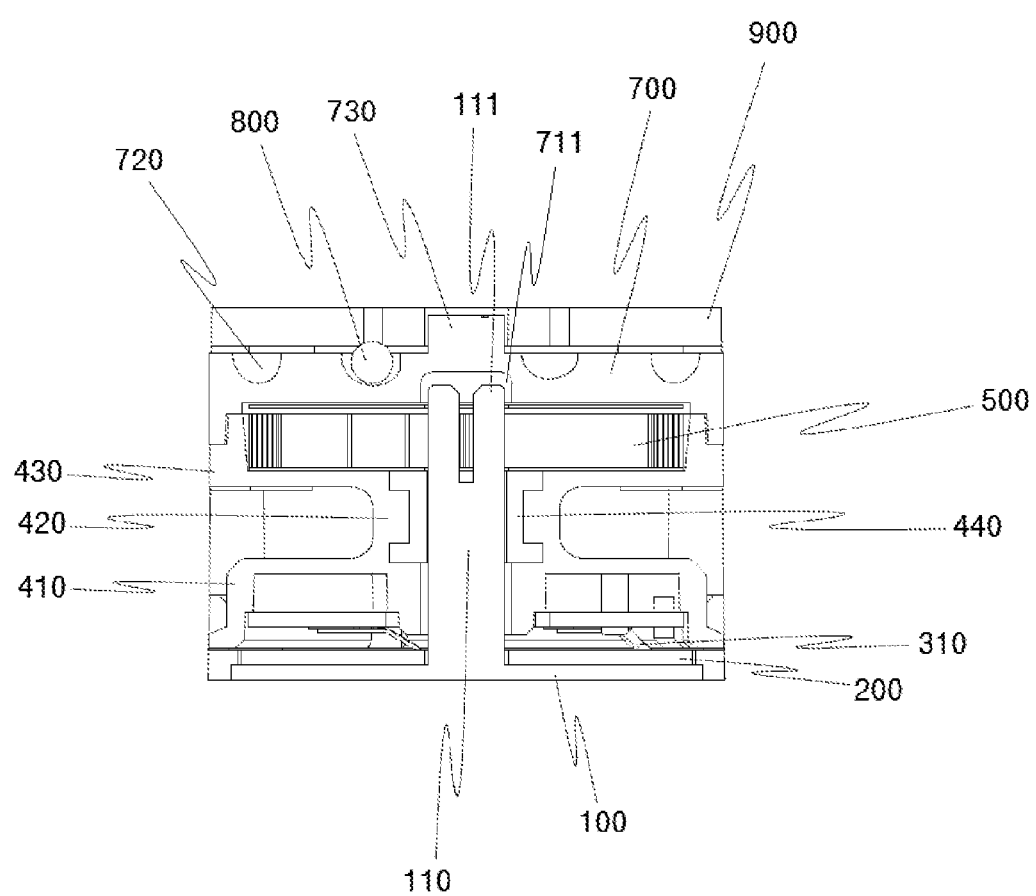
FIG. 6 is a sectional view illustrating a coupling status of an automatic winding module of a wire for Bluetooth headset with an improved wear resistance function of a rotation axis according to a second embodiment of the present invention.

Referring to FIG. 4 to FIG. 6, the invention according to the second embodiment is an automatic winding module of a wire. In this case, the automatic winding module may include a base housing (100) on which a cylindrical fixed axis (110) is formed in a direction vertical to one side thereof at the center of the side.

In this case, the automatic winding module may include a PCB substrate (200) which is coupled to one side of the base housing (100), is provided with a hollow at the center thereof such that the fixed axis (110) is coupled while passing through the center, and is provided with a PCB pattern (210) formed on the other side of the surface coming in contact with the base housing (100).

In this case, the automatic winding module may include a contact terminal coupling plate (300) which is provided with a pin contact terminal (310) coupled to one side thereof, is provided with a hollow at the center thereof such that the fixed axis (110) is coupled while passing through the center, and is configured such that the pin contact terminal (310) comes in contact with the PCB pattern (210) of the PCB substrate (200).

In this case, the automatic winding module may include a winding housing (400) including a sub-base lower housing (410) which is formed in a cylindrical cover type with one opened side, a cylindrical winding bobbin (420) which is provided at the center of the other side of the sub-base lower housing (410) such that a wire is wound on the outer circumference thereof, and a sub-base upper housing (430) which is provided on the other side of the winding bobbin (420) and is configured in a cylindrical shape with the other side opened in a direction opposite to a direction of opening the sub-base lower housing (410) with respect to the winding bobbin (420), and the winding housing (400) is provided with a hollow at the center thereof such that the fixed axis (110) is coupled while consecutively passing through the centers of the sub-base lower housing (410), the winding bobbin (420), and the sub-base upper housing (430), and includes a wear-resistant improved insert (440) on the inner circumference of the hollow center.

In this case, the automatic winding module may include a rolling elastic member (500) which has elasticity as a rolled type, and is accommodated in the sub-base upper housing (430) to provide rotational force to the winding housing (400).

In this case, the automatic winding module may include a pair of grease cover plates (1000) which are configured in a disc type, is provided with a hollow at the center thereof such that the fixed axis (110) is coupled while passing through the center, is coupled to the fixed axis (110) in a state of being positioned on both sides of the rolling elastic member (500) at the time of coupling, and is accommodated in the sub-base upper housing (430), to prevent rolling-applied grease from leaking out.

In this case, the automatic winding module may include a cap (700) which is configured in a cover type in which one side thereof covers the opening of the sub-base upper housing (430) and is coupled to the sub-base upper housing (430), and is provided with a track (720) for moving a stopper ball on the other side.

In this case, the automatic winding module may include a stopper ball (800) positioned on the track (720) to move along the track (720).

In this case, the automatic winding module may include a main case (900) which is configured to couple to the base housing (100), and covers the entire of one side provided with the track (720) of the cap (700) at the time of being coupled to the base housing (100).

The base housing (100) is configured in a plate type, and includes a cylindrical fixed axis (110) formed in a direction vertical to one side at the center of the side.

In this case, the base housing (100) may further include a plurality of coupling grooves (120) disposed radially on the outermost side in one side thereof.

The PCB substrate (200) is coupled to one side of the base housing (100).

The PCB substrate (200) is provided with a hollow at the center thereof such that the fixed axis (110) is coupled while passing through the center portion.

The PCB substrate (200) includes a PCB pattern (210) on the outer side of the surface coming in contact with the base housing (100).

In this case, the PCB pattern (210) may be configured with a PCB pattern for 2 pins.

In this case, the PCB pattern (210) may be configured with a PCB pattern for 4 pins.

The contact terminal coupling plate (300) is provided with a pin contact terminal (310) coupled on one side thereof.

In this case, the pin contact terminal (310) may be configured with any one of a 2-pin contact terminal or a 4-pin contact terminal in accordance with the PCB pattern (210).

The contact terminal coupling plate (300) is provided with a hollow at the center thereof such that the fixed axis (110) is coupled while passing through the center.

The contact terminal coupling plate (300) may be rotated about the fixed axis (110).

The contact terminal coupling plate (300) is configured such that the pin contact terminal (310) comes in contact with the PCB pattern (210) of the PCB substrate (200) at the time of being coupled to the fixed axis (110).

The winding housing (400) includes a sub-base lower housing (410), a winding bobbin (420), and a sub-base upper housing (430).

The winding housing (400) is provided with a hollow at the center thereof such that the fixed axis (110) is coupled while consecutively passing through the center.

The winding housing (400) may rotate about the fixed axis (110).

The winding housing (400) includes a wear-resistant improved insert (440) on the inner circumference of the hollow center.

Preferably, the wear-resistant improved insert (440) is made of metal.

The sub-base lower housing (410) is configured in a cylindrical cover type with one opened side.

The sub-base lower housing (410) is provided with a hollow at the center thereof such that the fixed axis (110) is coupled while passing through the center.

The sub-base lower housing (410) accommodates the PCB substrate (200) and the contact terminal coupling plate (300) therein at the time of being coupled to the fixed axis (110).

The winding bobbin (420) is cylindrical, and is configured at the center of the other side of the sub-base lower housing (410), and a wire is wound on the outer circumference thereof.

The winding bobbin (420) is provided with a hollow at the center thereof such that the fixed axis (110) is coupled while consecutively passing, at the time of being coupled while passing through the center of the sub-base lower housing (410).

The sub-base upper housing (430) is provided on the other side of the winding bobbin (420), and is configured in a cylindrical type with the other side opened in a direction opposite to a direction of opening the sub-base lower housing (410) with respect to the winding bobbin (420).

The sub-base upper housing (430) is provided with a hollow at the center thereof such that the fixed axis (110) is coupled while consecutively passing through the sub-base lower housing (410) and the winding bobbin (420) together.

The sub-base upper housing (430) is provided with an accommodation space to accommodate the rolling elastic member (500) and the grease cover plates (1000) therein.

In other words, the winding housing (400) is coupled in a type in which the sub-base lower housing (410) is opened outwards on one side thereof and the sub-base upper housing (430) is opened outwards on the other side thereof, with respect to the winding bobbin (420).

The rolling elastic member (500) has elasticity as a rolled type.

The rolling elastic member (500) is fitted to a lock coupling groove (111) of the fixed axis (110), after the fixed axis (110) is coupled to the winding housing (400) while passing.

In other words, in a rolled state of the rolling elastic member (500), one end positioned at the center in a rolled state is coupled to the fixed axis (110), the other end positioned on the outskirts is coupled to the sub-base upper housing (430). Accordingly, when the winding housing (400) is rotated about the fixed axis (110), the rolling elastic member (500) provides elasticity to the winding housing (400) to re-rotate the winding housing (400) in the opposite direction.

The rolling elastic member (500) is accommodated in the sub-base upper housing (430) to provide rotational force to the winding housing (400).

The grease cover plate (1000) is configured in a disc type.

The grease cover plate (1000) is provided with a hollow at the center thereof such that the fixed axis (110) is coupled while passing through the center.

The grease cover plate (1000) is rotated about the fixed axis (110).

The grease cover plates (1000) are provided in pair, and are coupled to the fixed axis (110) in a state of being positioned on both sides of the rolling elastic member (500) at the time of being coupled to the fixed axis (110).

The grease cover plates (1000) are accommodated in the sub-base upper housing (430) to prevent the rolling-applied grease from leaking out.

The cap (700) is configured in a cover type in which one side thereof covers the opening of the sub-base upper housing (430) and is coupled to the sub-base upper housing (430).

The cap (700) is provided with a coupling groove insertion portion (711) to which the end of the lock coupling groove (111) is fitted, at the center of one side.

The cap (700) is provided with a track (720) for moving a stopper ball on the other side.

The cap (700) is provided with a rotation axis insertion protrusion (730) at the center of the other side thereof.

The stopper ball (800) is positioned on the track (720) to roll and move along the track (720).

The main case (900) is coupled to the base housing (100).

The main case (900) covers the entire of one side on which the track (720) of the cap is formed, at the time of being coupled to the base housing (100).

The main case (900) is provided with a rotation axis groove (930) as a groove or a hollow so as to be fitted to the rotation axis insertion protrusion (730) at the center of one side thereof.

The main case (900) includes a plurality of coupling protrusions formed radially to correspond to the positions at which the coupling grooves (120) of the base housing (100) are formed, on the outermost side of one side thereof.

Accordingly, the present invention according to the second embodiment can provide an automatic winding module of a wire for Bluetooth headset with improved wear resistance of a rotation axis.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

Accordingly, since the present invention has an effect capable of providing the automatic winding module of the wire which firmly maintains the rotation axis without twist of the rotation axis even in case of using it for a long time, thereby preventing breakaway between the terminal and the PCB pattern, to prevent a short circuit from occurring and has another effect capable of providing the automatic winding module of the wire, wherein the rotation axis is firmly maintained without twist of the rotation axis even in case of using it for a long time, thereby preventing failure of the wire winding function caused by twist of the rotation axis, it can be widely used in industry.

REFERENCE SIGNS LIST

100: base housing
200: PCB substrate

300: contact terminal coupling plate
400: winding housing
500: rolling elastic member
600: closing clip
700: cap
800: stopper ball
900: main case
1000: grease cover plate

What is claimed is:

1. An automatic winding module of a wire comprising:
a base housing including
   a fixed axis having a cylindrical shape and vertically protruding from a surface of the base housing;
a winding housing including
   a sub-base lower housing formed in a cylindrical cover type and having a first side and a second side, the first side of the sub-base lower housing having an open-top container shape and being opposite to the second side of the sub-base lower housing,
   a sub-base upper housing formed in a cylindrical shape and having a first side and a second side, the second side of the sub-base upper housing having an open-top container shape and being opposite to the first side of the sub-base lower housing, and
   a cylindrical winding bobbin which is provided between the second side of the sub-base lower housing and the first side of the sub-base upper housing such that a wire is wound on an outer circumference of the cylindrical winding bobbin,
   wherein the winding housing has a hollow penetrating a center portion of the sub-base lower housing, the sub-base upper housing and the cylindrical winding bobbin;
a wear-resistant insert having a hollow cylindrical shape with a center hole formed along a central axis of the wear-resistant insert and disposed on an inner circumference of the hollow coaxially with the winding housing, such that an end of the wear-resistant insert and a surface of the second side of the sub-base upper housing is on a same level; and
a cap for covering the second side of the sub-base upper housing and having a center hole formed in a center of the cap,
wherein the fixed axis is inserted into the center holes of the wear-resistant insert and the cap.

2. The automatic winding module as claimed in claim 1, further comprising:
   a rolling elastic member which has elasticity as a rolled type, and is accommodated in the second side of the sub-base upper housing to provide rotational force to the winding housing.

3. The automatic winding module as claimed in claim 2, further comprising:
   a printed circuit board (PCB) disposed between the base housing and the sub-base lower housing and including a circuit for performing a communication; and
   a closing clip coupled to an end of the fixed axis for preventing the winding housing and the rolling elastic member from escaping from the fixed axis.

4. The automatic winding module as claimed in claim 2, further comprising:
   a main case coupled to the base housing to incorporate the automatic winding module.

5. The automatic winding module as claimed in claim 4, further comprising:
   a printed circuit board (PCB) disposed between the base housing and the sub-base lower housing and including a circuit for performing a communication; and
   a pair of grease cover plates provided at both sides of the rolling elastic member for preventing a grease from leaking out of the rolling elastic member.

* * * * *